US012156158B2

(12) United States Patent (10) Patent No.: US 12,156,158 B2
Comsa et al. (45) Date of Patent: Nov. 26, 2024

(54) PDCCH ORDER PRACH TRANSMISSION IN A MULTI-TRP OPERATION

(71) Applicant: InterDigital Patent Holdings, Inc., Wilmington, DE (US)

(72) Inventors: Virgil Comsa, Montreal (CA); Afshin Haghighat, Ile-Bizard (CA); Jonghyun Park, Syosset, NY (US); Dylan Watts, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/740,826

(22) Filed: Jun. 12, 2024

(65) Prior Publication Data

US 2024/0334358 A1 Oct. 3, 2024

Related U.S. Application Data

(63) Continuation of application No. PCT/US2023/019972, filed on Apr. 26, 2023.

(60) Provisional application No. 63/334,976, filed on Apr. 26, 2022.

(51) Int. Cl.
*H04W 56/00* (2009.01)
*H04L 1/1812* (2023.01)
*H04W 72/1268* (2023.01)
*H04W 72/231* (2023.01)

(52) U.S. Cl.
CPC ....... *H04W 56/0045* (2013.01); *H04L 1/1812* (2013.01); *H04W 72/1268* (2013.01); *H04W 72/231* (2023.01)

(58) Field of Classification Search
CPC .......... H04W 56/0045; H04W 72/231; H04W 72/1268; H04L 1/1812
USPC ........................................................ 370/503
See application file for complete search history.

(56) References Cited

U.S. PATENT DOCUMENTS

| | | | |
|---|---|---|---|
| 2020/0351841 A1* | 11/2020 | Cirik | H04B 7/088 |
| 2021/0068164 A1* | 3/2021 | Sato | H04W 74/0833 |
| 2022/0078771 A1* | 3/2022 | Jang | H04W 52/0219 |
| 2022/0418002 A1* | 12/2022 | Dinan | H04W 52/22 |
| 2023/0171776 A1* | 6/2023 | Dinan | H04W 76/27 370/336 |

FOREIGN PATENT DOCUMENTS

EP 3982678 A2 * 4/2022 ............. H04L 5/001

* cited by examiner

*Primary Examiner* — Peter G Solinsky
(74) *Attorney, Agent, or Firm* — Flaster Greenberg, P.C.

(57) ABSTRACT

A WTRU may receive downlink control information (DCI) from a first transmission/reception (TRP). The DCI may indicate that the WTRU is to transmit a physical random access channel (PRACH) transmission. The DCI may include an indication of a preamble, an indication of a first PRACH mask, and/or an indication associated with a first synchronization signal block (SSB), and/or an indication of a reference signal (RS). The WTRU may be configured to transmit the preamble, to a second TRP, the preamble in a first PRACH resource. The first TRP and/or the second TRP may be associated with a same physical cell identity (PCI). The WTRU may receive, from the second TRP, a first response to the preamble. The first response may include a first timing advance (TA) command for the second timing alignment for transmission to the second TRP and/or an index indicating the second TRP.

20 Claims, 7 Drawing Sheets

PDCCH ORDER PRACH TRANSMISSION IN A MULTI-TRP OPERATION

CROSS-REFERENCE TO RELATED APPLICATION

This application is a continuation of International Application No. PCT/US2023/019972, filed Apr. 26, 2023, which claims priority to U.S. Provisional Application No. 63/334,976, filed in the United States of America on Apr. 26, 2022, the entire contents are incorporated herein by reference.

BACKGROUND

Technical Field

The present disclosure relates generally to wireless communication systems. In particular, the present disclosure relates to a method and apparatus for multi-transmission/reception point (mTRP) with multiple timing advance (TA) operations in a wireless communication system.

Description of Related Art

The increasing demand for wireless data traffic after commercialization of the 4G communication system has resulted in a push for efforts to be made to develop an improved 5G communication system. Therefore, the 5G communication system or the pre-5G communication system is called a system after the 4G network (Beyond 4G Network) communication system or the LTE system after (Post LTE).

In order to achieve a high data rate, the 5G communication system is considered for implementation in a very high frequency (mmWave) band (for example, such as a 60 gigabyte (60 GHZ) band). In order to alleviate the path loss of radio waves and increase the propagation distance of radio waves in the ultra-high frequency band, beamforming, massive MIMO, and Full Dimensional MIMO (FD-MIMO), array antenna, analog beam-forming, and large scale antenna technologies are being discussed for use in the 5G communication system.

For network improvement of the system, an evolved small cell, an advanced small cell, a cloud radio access network (cloud radio access network: cloud RAN), an ultra-dense network (ultra-dense network), Device to Device communication (D2D), wireless backhaul, moving network, cooperative communication, Coordinated Multi-Points (COMP), and interference cancellation Technology development are being further developed in the 5G communication system.

In addition, advanced coding modulation (ACM) methods such as FQAM (Hybrid FSK and QAM Modulation) and SWSC (Sliding Window Superposition Coding), and advanced access technologies such as Filter Bank Multi Carrier (FBMC), NOMA (non-orthogonal multiple access), and sparse code multiple access (SCMA) are under research in the 5G system.

SUMMARY

Systems, methods, and apparatuses are described herein with respect to multi-Transmission/Reception Point (mTRP) with multiple timing advance (TA) operations in wireless systems(s). A wireless transmit/receive unit (WTRU) may receive a PDCCH order for triggering a Physical Random Access Channel (PRACH) transmission when the WTRU is configured in a multi-TRP operation in a multi-TRP deployment and/or transmitting one or more first PRACH according to the received PDCCH order by using one or more of an indicated preamble index, Synchronization Signal (SS) index/Physical Broadcast Channel (PBCH), and/or PRACH mask.

In examples, the implementation may include determining an uplink TA value for transmission of an uplink signal, wherein the uplink TA value is determined based on a single TA loop and/or transmitting one or more PRACH for initiating a second TA loop based on receiving an indication to transmit the second PRACH.

In examples, the implementation may include operating a timing advance timer (TAT) for the one or more TRP associated with a TRP link, and/or determining one or more intended TRP for one or more TA indicated based on the received PDCCH.

Systems, methods, and apparatuses may include receiving one or more timing advance groups (TAG) for a serving cell, wherein one or more (e.g., each) TAG is associated with a TRP link, and/or applying the TAG associated with a TRP.

Systems, methods, and apparatuses are described herein with respect to PDCCH order PRACH transmission in a mTRP operation. A WTRU may receive downlink control information (DCI) from a first transmission/reception (TRP). The DCI may indicate that the WTRU is to transmit a physical random access channel (PRACH) transmission. The DCI may comprise an indication of a preamble, an indication of a first PRACH mask, and/or an indication associated with a first synchronization signal block (SSB), and/or an indication of a reference signal (RS). The WTRU may be configured to transmit the preamble to a second TRP in a first PRACH resource. The first PRACH resource may be determined based on, for example, the first PRACH mask and/or the first SSB. The preamble may be transmitted using a spatial filter determined based on, for example, the indicated RS. The first TRP and/or the second TRP may be associated with a same physical cell identity (PCI).

The WTRU may determine to transmit the preamble to the second TRP based on, for example, the spatial filter. The WTRU may maintain a first timing alignment for transmission to the first TRP and/or maintain a second timing alignment for transmission to the second TRP. The WTRU may receive, from the second TRP, a first response to the preamble. The first response may include a first timing advance (TA) command for the second timing alignment for transmission to the second TRP and/or an index indicating the second TRP. The first response may be a Random Access Response (RAR). The WTRU may be configured to transmit an uplink (UL) transmission to the second TRP using the determined spatial filter and/or with timing based on the first TA command. The WTRU may determine the spatial filter to use to transmit the preamble to the second TRP using the indicated RS.

The WTRU may receive the DCI in a PDDCH order that triggers the PRACH transmission. The DCI may include an indication of a second PRACH mask and/or an indication associated with a second SSB. The WTRU may transmit the preamble to the first TRP using a second PRACH resource that is determined based on, for example, the second PRACH mask and/or the second SSB. The WTRU may receive from the first TRP, a second response to the preamble transmitted using the second PRACH resource. The second response may include a timing advance command for the first timing alignment for transmission to the first TRP. The second response may include an index of the first TRP. The DCI may include a timing advance (TA) medium access control (MAC) control element (CE). The MAC CE may indicate a TRP index. The TRP may indicate that a TA is associated with the first TRP and/or the second TRP.

DETAILED DESCRIPTION

Figure 1A:
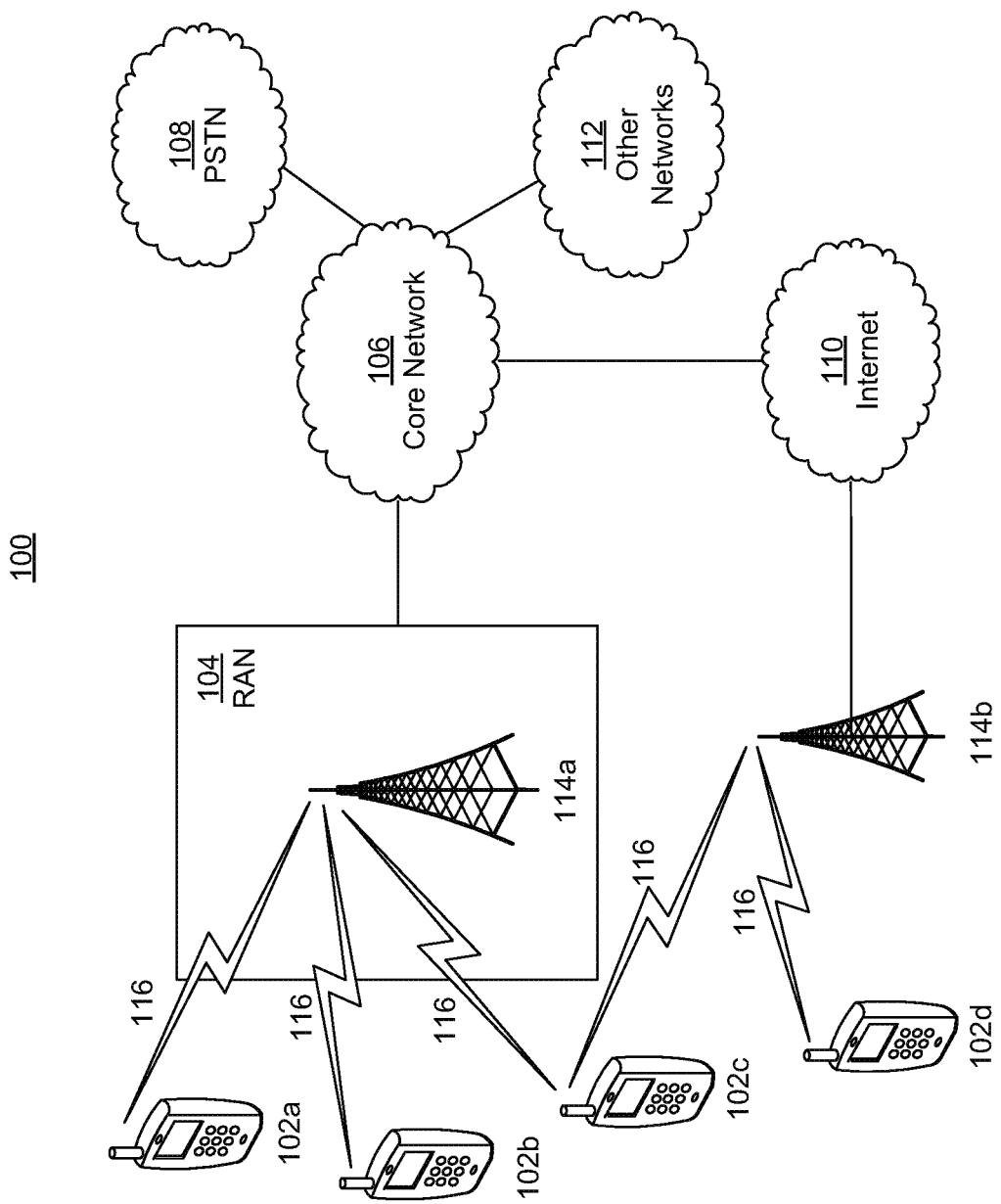
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
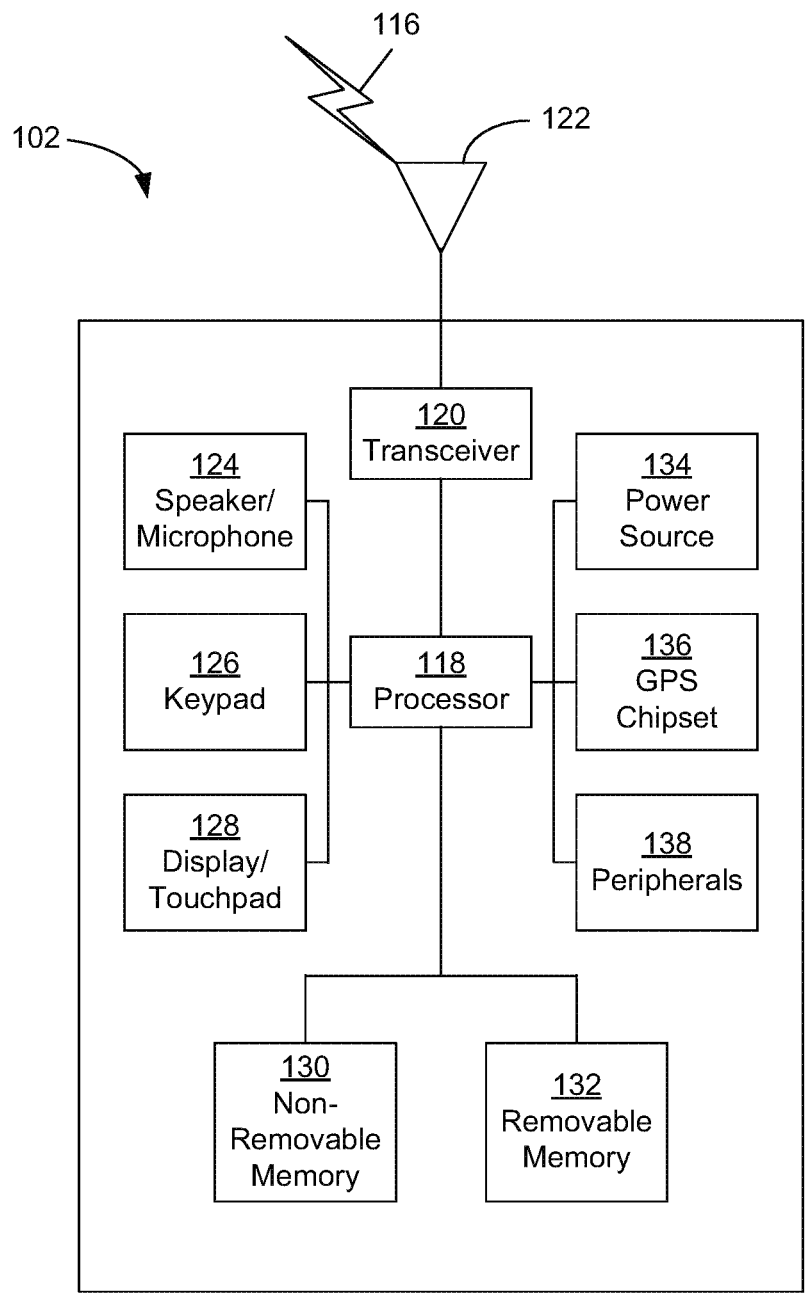
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
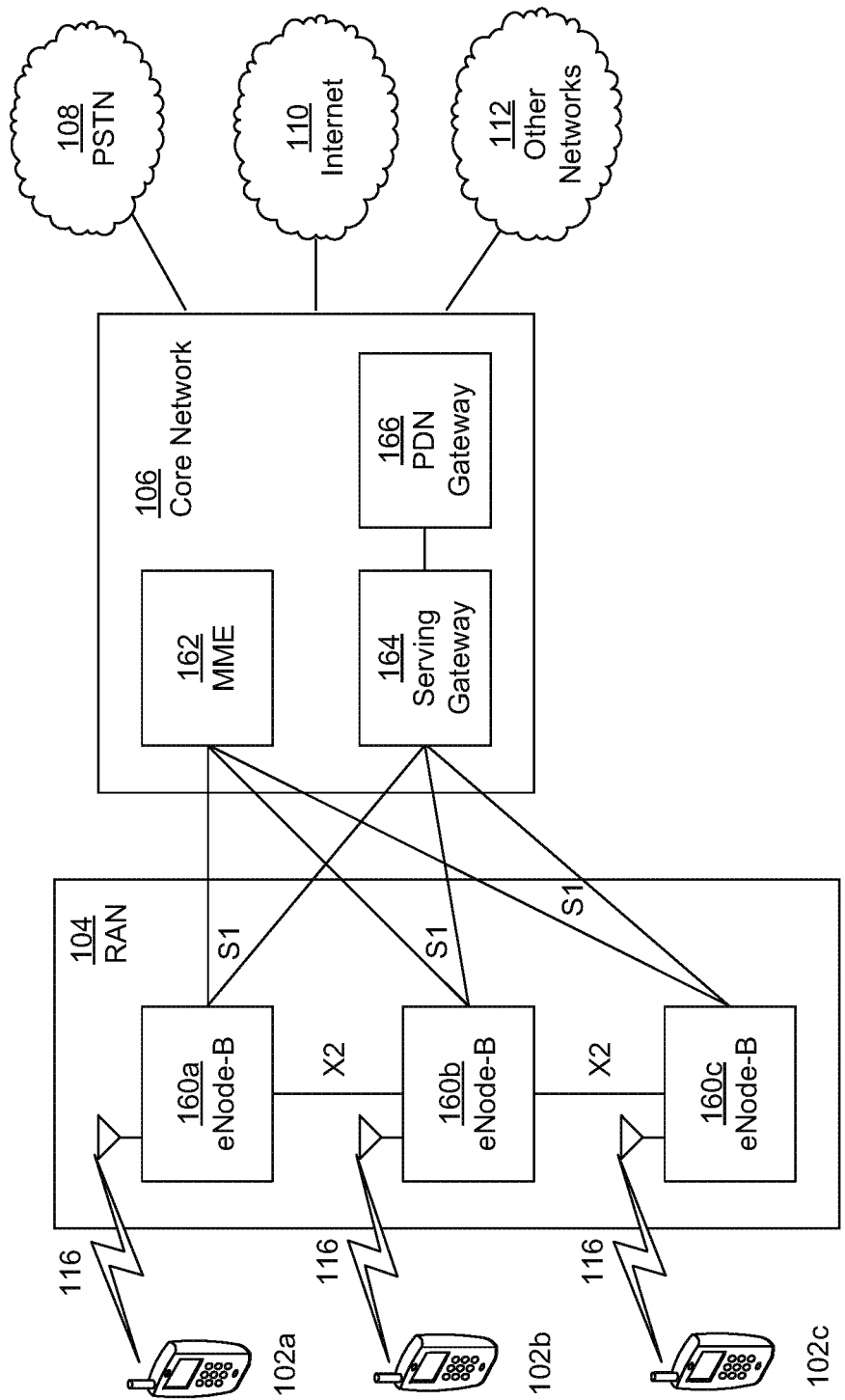
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
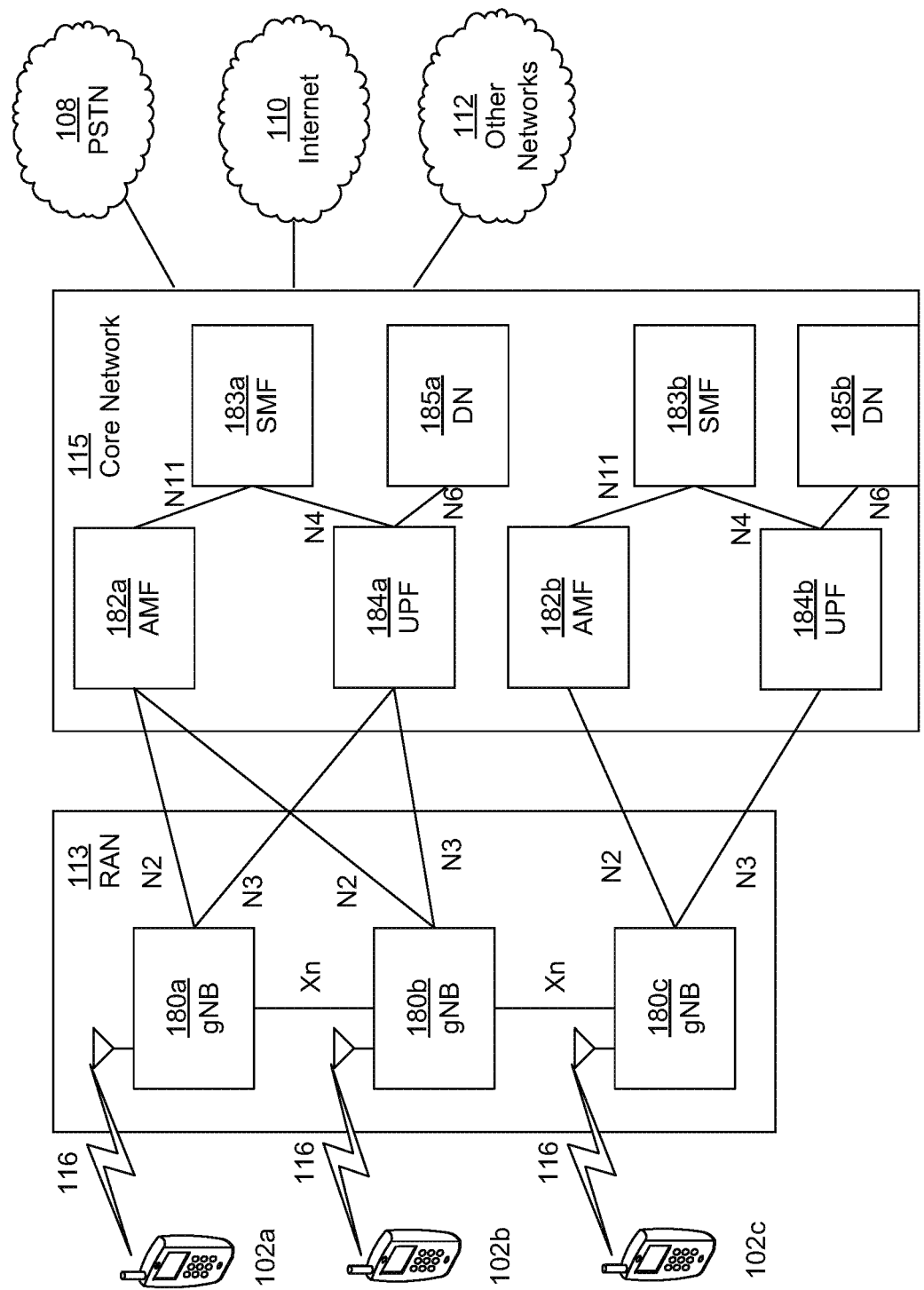
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The term aTRP may be used interchangeably herein with the term secondary transmission/reception point (sTRP).

In examples, one of New Radio (NR) multiple input multiple output (MIMO) features may have been mTRP operation where the TRPs share the same PCI. As an evolution, in Rel-17 the work may have expanded the scope of the mTRP scenario with one or more different features, including a unified Transmit Configuration Identification (TCI) concept that allows for a faster and/or more (e.g., much more) efficient management of the one or more TCI states and/or beam management. The reception from the one or more TRPs may have been determined within a cyclic prefix. That may have allowed for a full timing synchronization (e.g., alignment of the one or more transmission(s) between/among the one or more TRPs) determined between the one or more TRPs. For example, synchronization may include the WTRU maintaining timing alignment for transmission with two or more TRPs. For example, a WTRU may maintain (e.g., use) a first timing alignment for transmission to a first TRP and maintain (e.g., use) a second timing alignment for transmission to a second TRP.

In examples, the MIMO evolution work item may have went a step further and/or may intend to diversify the one or more deployment(s) by allowing two timing advance (TA) loops based on, for example, two non-collocated TRPs, two WTRU antenna panels, maximum of 4 UL MIMO layers, two layers per panel, and/or based on mDCI (e.g., multi DCI) reception and/or simultaneous/overlapping Physical Uplink Shared Channel (PUSCH) PUSCH+PUSCH and/or Physical Uplink Control Channel (PUCCH) PUCCH-PUCCH UL transmissions.

Figure 2:
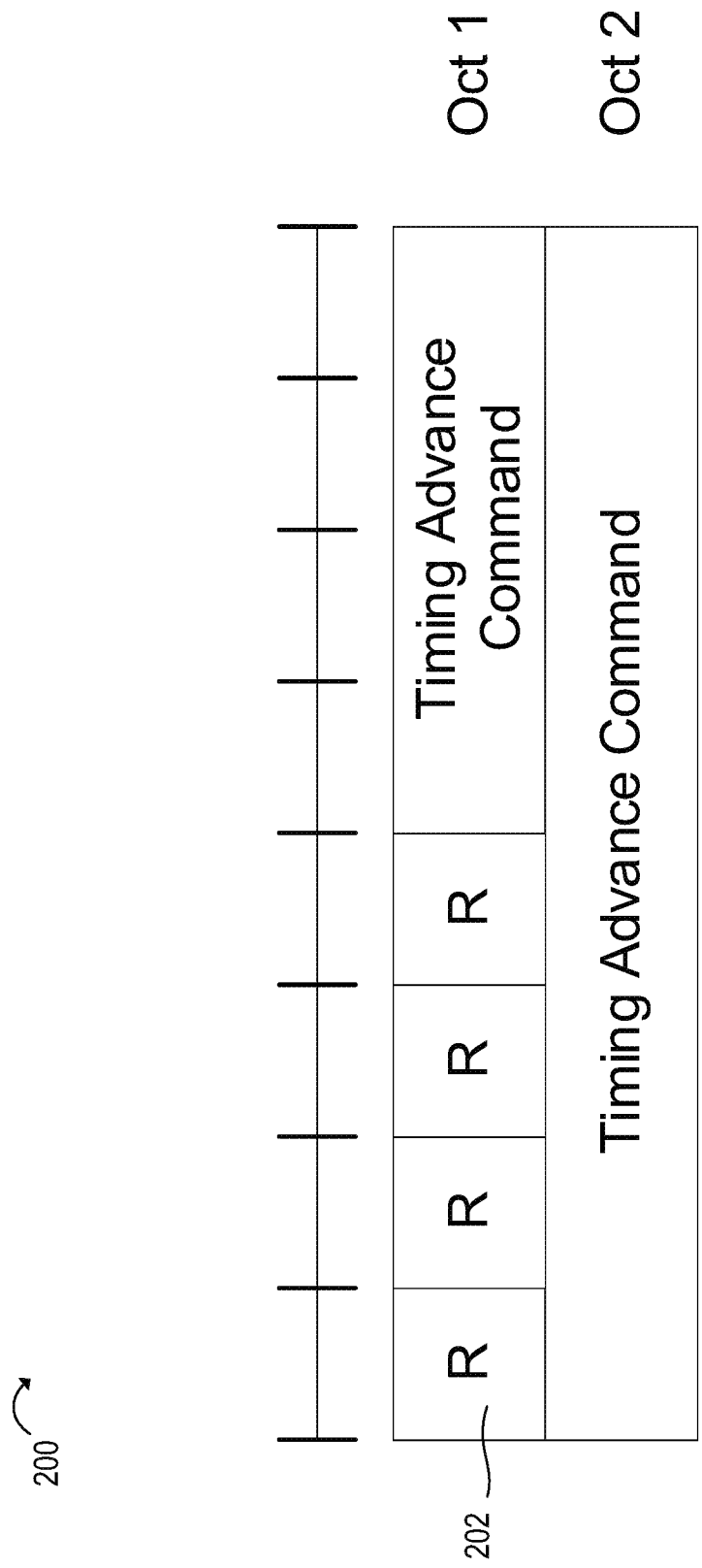
FIG. 2 is a diagram illustrating an example of an absolute timing advance command medium access control (MAC) control element (CE) format.

FIG. 2 is a diagram illustrating an example of an absolute timing advance command MAC CE 200. In examples, the absolute timing advance command MAC CE 200 may be identified by a MAC subheader with extended Logical Channel ID (eLCID). The MAC indication may have a fixed size and/or may include two (e.g., or more) octets defined as shown in FIG. 2. In examples, the timing advance command field may indicate the index value TA. In examples, the TA may be used to control the amount of timing adjustment that the MAC entity may have to apply. In examples, the size of the TA command field may be 12 bits. In example, R 202 may be the reserved bit, which may be, for example, set to 0. The MAC CE 200 may indicate whether the TA is associated with a first TRP and/or a second TRP. For example, the MAC CE 200 may indicate a TRP index that indicates that the TA is associated with the first TRP and/or the second TRP.

Figure 3:
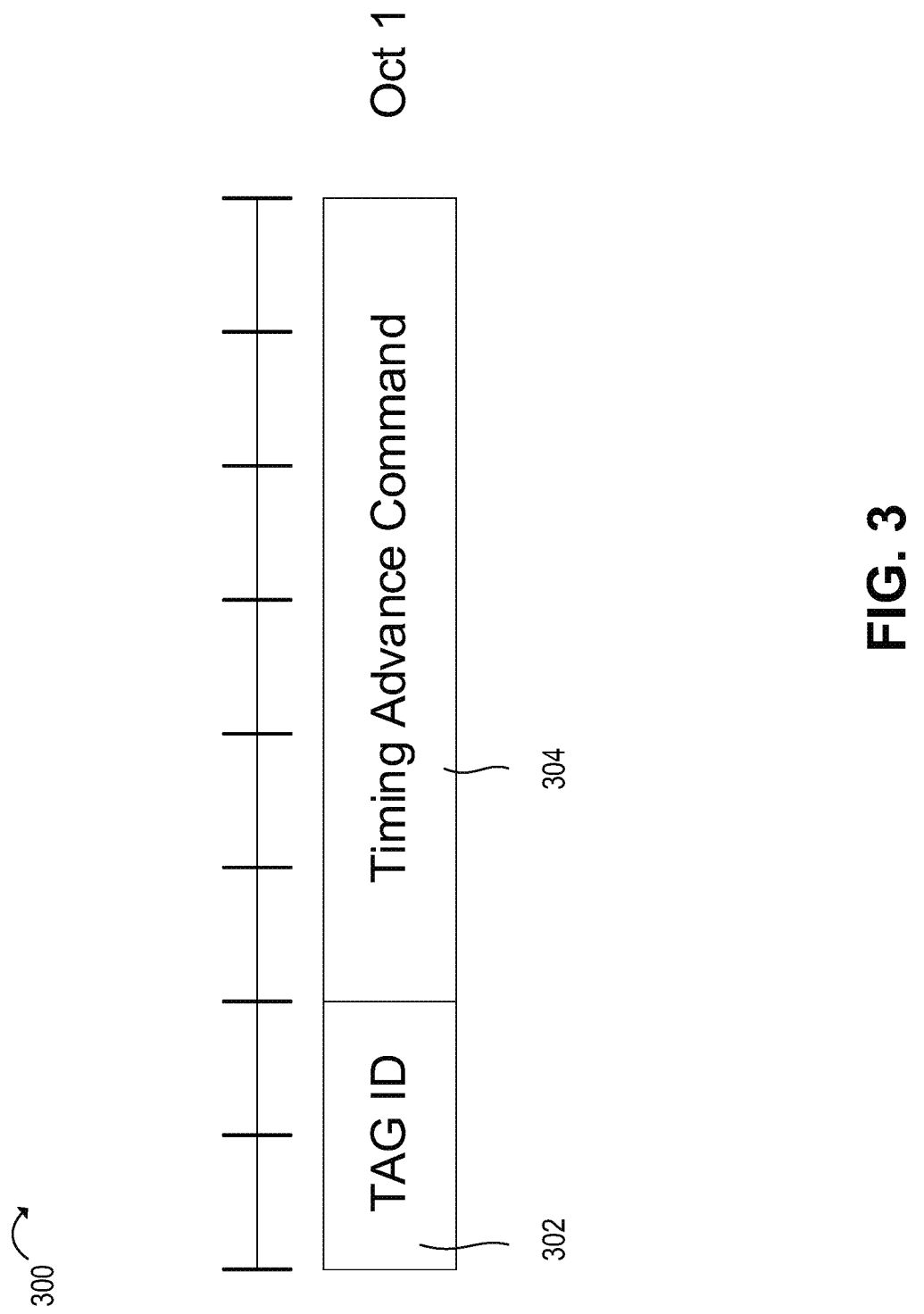
FIG. 3 is a diagram illustrating an example of a relative timing advance command MAC CE format.

FIG. 3 is a diagram illustrating an example of a relative timing advance command MAC CE 300. In examples, the WTRU may receive a relative TA command format while in connected mode. In examples, the TA command MAC CE 300 may be identified by a MAC subheader with LCID. In examples, the command may have a fixed size and/or may include a single octet as shown in FIG. 3. In examples, a timing advance group (TAG) Identity (TAG ID) field 302 may indicate the TAG identity of the addressed TAG. In examples, the TAG including the SpCell may have the TAG Identity 0. In examples, the length of the field may be 2 bits. In examples, the TA Command field 304 may indicate the index value TA (e.g., 0, 1, 2, 3, 4, 5, . . . 63, etc.). The Timing Advance Command field 304 may be used to control the amount of timing adjustment that the MAC entity has to apply. In examples, the length of the field may be 6 bits. The MAC CE 300 may indicate whether the TA is associated with a first TRP and/or a second TRP. For example, the MAC CE 300 may indicate a TRP index that indicates that the TA is associated with the first TRP and/or the second TRP. For example, the TAG ID field 302 may indicate the TRP index.

In examples, in a transmission system with a single TA support, a Serving cell may be associated with a single TAG where one or more (e.g., each) TAG(s) may be associated with a single time alignment timer. In examples, if a WTRU does not receive an update within the time window set by the timer, the timer may expire and/or the WTRU may suspend one or more (e.g., all) UL transmission(s) to the affected cells apart from Random access preamble transmission(s) and/or MsgA transmission(s). In examples, if a timer expires, the WTRU may flush one or more (e.g., all) HARQ buffer(s). In examples, if a timer expires, the WTRU may release one or more (e.g., all) configured PUCCH and/or Sounding Reference Signal (SRS). In examples, if a timer expires, the WTRU may clear one or more (e.g., all) configured downlink assignments. In examples, if a timer expires, the WTRU may clear one or more (e.g., all) configured UL grants. In examples, if a timer expires, the WTRU may clear one or more (e.g., any, all) PUSCH resource(s) for semi-persistent CSI for one or more (e.g., all) serving cell(s) upon expiry of the timeAlignementTimer associated with the PTAG, which may be, for example, the TAG group the SpCell belongs to (e.g., otherwise the one or more expiry action(s) may be (only) performed for the one or more serving cell(s) which are associated with the TAG). In examples, if a timer expires, the WTRU may clear one or more PUSCH resources for semi-persistent CSI for all serving cells upon expiry of the timeAlignementTimer associated with the PTAG, which may be, for example, the TAG group the SpCell belongs to. In examples, if a timer expires, the WTRU may clear all PUSCH resources for semi-persistent CSI for one or more serving cells upon expiry of the timeAlignementTimer associated with the PTAG, which may be, for example, the TAG group the SpCell belongs to. In examples, if a timer expires, the WTRU may clear all PUSCH resources for semi-persistent CSI for all serving cells upon expiry of the timeAlignementTimer associated with the PTAG, which may be, for example, the TAG group the SpCell belongs to. In examples, the expiry actions may be performed for the serving cells which are associated with the TAG. In examples, the expiry actions may be performed only for the serving cells which are associated with the TAG.

In examples, in a NR operation, the MAC CE carrying the TA command may be associated with a specific cell. For example, in an intra-cell multi-Transmission/Reception Point (multi-TRP, or mTRP) scenario, where multiple TRPs may be associated with a same cell, individual TA indication for one or more (e.g., each) Transmission/Reception Point (TRPs) may not be supported. In examples, if individual TA indication for one or more (e.g., each) TRP(s) is supported, it may be difficult to estimate one or more individual TA value(s) for one or more (e.g., each) TRP link. For example, in an intra-cell mTRP scenario, a PCI may include a serving cell. The serving cell may be referred to as a Primary TRP (pTRP). The pTRP may have an SSB configuration. For example, in an intra-cell mTRP scenario, a PCI may include an additional TRP (sTRP) that may not have a SSB configuration. In examples, the sTRP may be measured by a WTRU on Channel State Information-Reference Signal (CSI-RS) and/or one or more tracking RS(s) In examples, the MAC CE carrying the TA command may be associated with the MAC entity with a particular cell. For example, the MAC CE TA command may not be associated with the Primary TRP. For example, the MAC CE TA command may not be associated with the sTRP, as described herein. In examples, timing advance measurements and/or association of the TA commands may be initiated per individual radio link and/or one or more simultaneous TA command(s) and/or their (e.g., respective) application(s). The MAC CE may indicate whether the TA command is associated with a primary TRP and/or a secondary TRP. For example, the MAC CE may indicate a TRP index that indicates that the TA command is associated with the primary TRP and/or the secondary TRP.

Systems, methods, and/or apparatuses are provided herein with respect to procedures initiating one or more (e.g., multiple) TAs measurement(s) and/or update(s). Systems, methods, and/or apparatuses are provided herein with respect to procedures for indication and/or association of one or more (e.g., multiple) TAs to TRPs.

Systems, methods, and/or apparatuses are provided herein with respect to procedures for initiation and/or maintenance of one or more (e.g., multiple) TA measurement(s). In a multi-DCI multi-TRP transmission with multiple TA support, a WTRU may receive a PDCCH order Random Access Channel (RACH) to update one or more TA value(s) for one or more (e.g., each) TRP link.

Systems, methods, and/or apparatuses may include a PDCCH Order PRACH transmission in multi-TRP. A gNB may trigger transmission of a PRACH to reestablish synchronization (e.g., including a set of one or more PRACH resources) for uplink transmission by a WTRU. Such initiation may occur for one or more different reasons. For example, a gNB may trigger transmission of a PRACH when a WTRU has not been scheduled for transmission for a certain duration in time. In NR, the triggering of a random access transmission for reestablishing the synchronization may be implemented through a PDCCH order, by which a DCI may provide relevant information for transmission of a PRACH (e.g., such as a preamble index and/or an SSB index) that may be used as a point of reference for determination of an associated RACH occasion. A WTRU may receive DCI from a first TRP. The DCI may indicate that the WTRU is to transmit a PRACH transmission. The DCI may include an indication of a preamble, an indication of a first PRACH mask, an indication associated with a first SSB, and/or an indication of a RS. The WTRU may receive the DCI in a PDCCH order that triggers the PRACH transmission.

The WTRU may determine a spatial filter based on the indicated RS. The WTRU may determine to transmit the preamble to the second TRP based on the spatial filter. The WTRU may transmit the preamble to a second TRP in a first PRACH resource that may be determined based on, for example, the first PRACH mask and/or the first SSB. The preamble may be transmitted using a spatial filter determined based on the indicated RS. The first TRP and the second TRP may be associated with the same physical cell identity (PCI). The WTRU may receive a response (e.g., such as a random access response (RAR) to the preamble from the second TRP. The response may include a timing advance (TA) command for a timing alignment for transmission to the second TRP and/or an index indicating the second TRP.

In a mTRP deployment, a WTRU may maintain its synchronization with one or more (e.g., two or more) different TRPs. For example, in a mTRP deployment, a WTRU may be required to maintain its synchronization with at least two different TRPs. As an example, a WTRU may be dynamically switched between single- and multi-TRP transmission modes, which may require maintaining an accurate timing synchronization, for example, at all times. For example, the WTRU may use a first timing alignment with a first TRP and may use a second timing alignment with a second TRP. A WTRU may be configured to maintain an accurate timing synchronization (e.g., including a set of one or more PRACH resources) at (e.g., all) times, for example, if the WTRU may be dynamically switched between single- and multi-TYP transmission modes. As described herein, the PDCCH order (e.g., from pTRP to send PRACH to sTRP for UL synchronization/timing alignment) may include one or more of the following: a preamble identifier; a TRP indication indicating sTRP (e.g., CORESETPOOL index); an SSB index (e.g., associated with the pTRP); a PRACH mask; and/or an RS indicator (e.g., CSI-RS and/or tracking RS) associated with the sTRP. If the timing alignment for pTRP and sTRP includes one PDCCH order, the PDCCH order may include a second SSB index (e.g., associated with the pTRP) and/or a second PRACH mask. As described herein, the PDCCH order may include one or more of the following: TRP index; pTRP SSB index to determine PRACH resource; and/or sTRP RS to determine filter for transmission (Tx). As described herein, the WTRU may transmit a preamble based on the preamble identifier using the determined PRACH resource and/or the determined spatial filter. As described herein, the WTRU may transmit a preamble based on the preamble identifier using the determined PRACH resource and/or the determined spatial filter. If the timing alignment for pTRP and sTRP includes one PDCCH order, the WTRU may transmit the same preamble to the pTRP based on the second SSB index and/or the second PRACH mask. The WTRU may receive an RAR including a TRP indication and/or a TA indication. If the timing alignment for pTRP and sTRP includes one PDCCH order, the RAR may include a second TA. The WTRU may transmit an UL transmission to the sTRP using the determined spatial filter and/or with timing based on the TA indication.

In a multi-TRP deployment, a WTRU configured in multi-TRP operation may receive a PDCCH order to trigger a PRACH transmission. In examples, a WTRU may be configured with one or more of the behaviors described herein, for example, once the WTRU receives a PDCCH order for PRACH transmission with respect to a single-DCI multi-TRP operation or a multi-DCI multi-TRP operation.

In a single-DCI multi-TRP operation, PRACH transmission may occur for the TRP originating the PDCCH order PRACH. In examples, a WTRU may transmit a single PRACH according to the received PDCCH order, by using the indicated preamble index (e.g., one or more PRACH resources), a Synchronization Signal (SS)/PBCH index (e.g., SSB index) and/or a PRACH mask. In examples (e.g., in this case), a WTRU may use Demodulation Reference Signal (DMRS) of the received PDCCH as the RS source for the spatial information (e.g., spatial filter based on the RS indicator) for transmission of the preamble (e.g., based on the preamble identifier using the determined PRACH resource and/or the determined spatial filter). For example, the WTRU may transmit the preamble using a spatial filter based on an indicated RS (e.g., such as the DMRS). In examples, a WTRU may receive a Random Access Response (RAR) message including the TA and a TRP indication. In examples, a WTRU may apply the indicated TA for one or more (e.g., all) future transmission(s) to one or more (e.g., both) TRPs until the next TA indication. In examples, a WTRU may receive an implicit and/or explicit indication, for example, in the RAR message, that the WTRU may apply the indicated TA to the TRP originating (e.g., TRP indication) the PDCCH order for one or more (e.g., all) future transmission(s) until the next TA indication. For example, the WTRU may receive a response message (e.g., the RAR message) in response to the preamble. The response message may comprise a TA command for a timing alignment for transmission to the TRP originating the PDCCH order.

In a single-DCI multi-TRP operation, PRACH transmission may occur for the TRP not originating the PDCCH order PRACH. The WTRU may receive a DCI from a first TRP. For example, the DCI may be received in the PDCCH order. The DCI may indicate that a WTRU is to transmit the PRACH transmission. In examples, based on an information element that may be carried by the same PDCCH (e.g., a field), a WTRU may transmit a single PRACH to a second TRP (e.g., the TRP not originating the PDCCH order/DCI) according to the received PDCCH order, for example, by using the indicated preamble index (e.g., one or more PRACH resources), SS/PBCH index (e.g., SSB index associated with pTRP), TRP index, and/or the PRACH mask. For example, the DCI may include an indication of a preamble, an indication of a first PRACH mask, an indication of a second PRACH mask, an indication associated with a first SSB, an indication associated with a second SSB, and/or an indication of a RS. The first TRP and the second TRP may be associated with a same physical cell identity (PCI). Additionally or alternatively, a WTRU may detect an RS index indicated in the received PDCCH that may be used as the RS source for the spatial information (e.g., spatial filter determined based on the RS source) for transmission of the preamble. For example, the WTRU may determine the spatial information (e.g., spatial filter) to use to transmit the preamble to the second TRP based on an indicated RS (e.g., such as the RS index or a DMRS). The WTRU may transmit the preamble using a spatial filter determined based on the indicated RS (e.g., such as the DMRS). For example, the WTRU may determine to transmit the preamble to the second TRP based on the spatial information (e.g., spatial filter). In examples, the indicated RS may be associated with the other TRP. For example, the DCI may include an indication of a preamble (e.g., such as the preamble index), an indication of the PRACH mask, an indication associated with a SSB (e.g., such as the SS/PBCH index), and/or an indication of a reference signal (RS) (e.g., such as the RS index). The DCI may be received in the information element that may be carried by the same PDCCH. The WTRU may transmit the preamble to the second TRP in a first PRACH resource that is determined based on the first PRACH mask and/or the first SSB. The WTRU may receive a RAR message including the TA. For example, the WTRU may receive a response message (e.g., the RAR message) in response to the preamble. The response message may include a TA command for a timing alignment for transmission to the second TRP (e.g., the TRP not originating the PDCCH order PRACH). For example, a WTRU may apply the indicated TA (e.g., by the TA command) for one or more (e.g., all) future transmissions to one or more (e.g., both) TRPs (e.g., TRP indication) until the next TA indication. For example, a WTRU may receive an implicit and/or explicit indication, for example, in the RAR message, that the WTRU may apply the indicated TA to the TRP not-originating the PDCCH order PRACH for one or more (e.g., all) future transmissions until the next TA indication. for this TRP (e.g., TRP indication). For example, a WTRU may receive an implicit or explicit indication, for example, in the RAR message, that the WTRU may apply the indicated TA (e.g., only) to the TRP not-originating the PDCCH order PRACH for future (e.g., all future) transmission(s) until the next TA indication. For example, the WTRU may send an uplink transmission to the second TRP using the determined spatial filter and with timing based on the TA command.

In a single-DCI multi-TRP operation, PRACH transmission for both TRPs may be based on a received PDCCH order PRACH. In examples, a WTRU may transmit one or more PRACH according to the information carried by the received PDCCH. A WTRU may detect one or more indicated values for one or more of: preamble index (e.g., one or more PRACH resources), SS/PBCH index (e.g., SSB index), and/or PRACH mask. Additionally or alternatively, a WTRU may detect an RS index indicated in the received PDCCH that may be used as the RS source for the spatial information (e.g., spatial filter based on the RS indicator) for transmission of the preamble. In examples, a WTRU may receive a single PRACH index, one or more (e.g., two) Synchronization Signal Block (SSB)/PBCH indices, one or more (e.g., two) PRACH mask value(s), and one (e.g., or more) RS index. A WTRU may transmit one or more (e.g., two) PRACH using the same preamble index at two different occasions according to the indicated (e.g., two) SSB/PBCH indices, (e.g., two) PRACH mask value(s), (e.g., two) DMRS of the PDCCH, and/or the indicated RS in the PDCCH for the first and/or second transmission(s). In examples, a WTRU may receive a RAR message including a single TA and/or TRP indication. For example, a WTRU may apply the indicated TA for one or more (e.g., all) future transmissions to one or more (e.g., both) TRPs (e.g., TRP indication) until the next TA indication. For example, a WTRU may receive an implicit and/or an explicit indication (e.g., in the RAR message, that the WTRU may apply the indicated TA (e.g., only) to the TRP originating and/or not-originating the PDCCH order PRACH for one or more (e.g., all) future transmissions until the next TA indication. In examples, a WTRU may receive a RAR message including one or more TA. According to one or more rules and/or a received indication, a WTRU may select and/or apply one or more of the indicated TA values for one or more (e.g., all) future transmissions to one or more (e.g., all) TRPs until the next TA indication. A WTRU may apply the one or more indicated TA values to the one or more corresponding TRPs.

In an example, in a single-DCI multi-TRP operation, PRACH transmission for both TRPs may be based on a received PDCCH order PRACH. In an example, a WTRU may transmit more than one PRACH according to the information carried by the received PDCCH. In an example, a WTRU may detect one or more indicated values for at least one of preamble index, for example, SS/PBCH index, and PRACH mask. In an example, a WTRU may detect an RS index indicated in the received PDCCH that may be used as the RS source for the spatial information for transmission of the preamble. In an example, a WTRU may receive a single PRACH index, two SSB/PBCH indices, two PRACH mask values and/or one RS index. In an example, a WTRU may transmit two PRACH, using the same preamble index at two different occasions according to the indicated two SSB/PBCH indices, two PRACH mask values, using two DMRS of the PDCCH and/or the indicated RS in the PDCCH for the first and/or second transmissions.

In an example, a WTRU may receive a RAR message containing a single TA. In an example, a WTRU may apply the indicated TA for one or more (e.g., all) future transmissions to both TRPs until the next TA indication. In an example, a WTRU may receive an implicit and/or explicit indication, for example, in the RAR message, that it may apply the indicated TA to the TRP originating or not-originating the PDCCH order PRACH for one or more future transmissions until the next TA indication. In an example, a WTRU may receive an implicit and/or explicit indication, for example, in the RAR message, that it may apply the indicated TA only to the TRP originating or not-originating the PDCCH order PRACH for one or more (e.g., all) future transmission until the next TA indication. In an example, a WTRU may receive a RAR message including more than one TA. In an example, according to a rule and/or a received indication, a WTRU may select and/or apply one or more of the indicated TA values for one or more future transmission to both TRPs until the next TA indication. In an example, according to a rule or a received indication, a WTRU may select and/or apply one of the indicated TA values for one or more (e.g., all) future transmissions to both TRPs until the next TA indication. In an example, a WTRU may apply the indicated TA values to the corresponding TRPs. In an example, a single-DCI multi-TRP operation may include PRACH transmission according to the last indicated multi-TRP mode. In a single-DCI multi-TRP transmission, for example, a WTRU may be scheduled dynamically to alternate between single and multi-TRP transmission. Additionally or alternatively, for example, a WTRU may switch the order of transmission. In examples, if the last scheduled uplink transmission was intended for both TRPs (e.g., multi-TRP mode of operation indicated by an SRS Resource Indicator (SRI), for example, code points 10 and/or 11), a WTRU may transmit PRACH to one or more (e.g., both) TRPs. Additionally or alternatively, if the last scheduled uplink transmission was intended for (e.g., only) one of the TRPs (e.g., single-TRP mode of operation indicated by an SRI, for example, code points 00 and/or 01), a WTRU may transmit PRACH according to the corresponding TRP.

In a multi-DCI multi-TRP operation, a WTRU may transmit a single PRACH per TRP according to the received PDCCH order received from one or more (e.g., each) TRP(s). For example, for one or more (e.g., each) transmission(s), a WTRU may use the indicated preamble index, SS/PBCH index, and/or PRACH mask. In examples, a WTRU may use DMRS of one or more (e.g., each) received PDCCH as the RS source for the spatial information (e.g., spatial filter based on the RS indicator) for transmission of one or more (e.g., each) preamble. In examples, a WTRU may receive a single RAR message including a single TA and/or TRP indication. For example, a WTRU may apply the indicated TA for one or more (e.g., all) future transmissions to one or more (e.g., both) TRPs (e.g., TRP indication) until the next TA indication. For example, a WTRU may receive an implicit and/or explicit indication, e.g., in the RAR message, that the WTRU may apply the indicated TA (e.g., only) to one of the TRP, e.g., associated to one of the CORSETPoolIndex. In examples, a WTRU may receive a single RAR message including one or more (e.g., two) TA values. In examples, a WTRU may apply the indicated TA value(s) to the corresponding TRPs. In examples, a WTRU may receive one or more RAR messages. The one or more (e.g., each) RAR messages may correspond to one or more PRACH transmissions. The one or more (e.g., each) RAR messages may include one or more TAs. The WTRU may receive one or more (e.g., multiple) TA commands in one or more RAR messages. In examples, according to a rule and/or a received indication, a WTRU may select and/or apply one or more of the indicated TA value(s) for one or more (e.g., all) future transmission(s) to one or more (e.g., both) TRPs until the next TA indication. In an example, according to a rule and/or a received indication, a WTRU may select and/or apply one of the indicated TA values for future transmission (e.g., all future transmission) to both TRPs until the next TA indication. In examples, a WTRU may apply the one or more indicated TA value(s) to the one or more corresponding TRP(s).

In examples, in NR, the PDCCH order PRACH may be carried by DCI format 1_0 and/or may be scrambled by C-RNTI. In examples, if the field corresponding to "Frequency domain resource assignment" are of ones, then the remaining one or more field(s) may be interpreted as follows. For example, Random Access Preamble index may be 6 bits. For example, reserved bits may be 10-12 bits. In examples, if the value of the "Random Access Preamble index" is not (e.g., all) zeros, UL/SUL indicator may be 1 bit, SS/PBCH index may be 6 bits, and/or PRACH Mask index may be 4 bits.

Indication of one or more of the following examples/may be used to support implementation of the examples and/or embodiments described herein. In an embodiment, indication of one or more of the following embodiments may support implementation of the examples and embodiments described above. One may include an RS that is used as the source for indication of spatial information (e.g., spatial filter based on the RS indicator) included for transmission of the preamble associated with the second TRP. Additionally or alternatively, examples may include an additional preamble that may be associated with the second TRP. Additionally or alternatively, examples may include an additional SS/PBCH index. Additionally or alternatively, examples may include an additional PRACH Mask index.

In examples, the remaining reserved bits may be 10. The indication of the one or more examples described herein may be associated with overhead. The overhead may be reduced, for example, using one or more of the following examples. Examples may include a WTRU that may use the SSB associated to the indicated SS/PBCH index as the RS source for spatial information (e.g., spatial filter based on the RS indicator) included for transmission of the second preamble. Additionally or alternatively, examples may include a WTRU that may use the (e.g., same) preamble for PRACH transmission to the first and second TRP. Additionally or alternatively, examples may include, if supported by WTRU reported capability, a WTRU that may use a same SS/PBCH and/or PRACH mask index for transmission of one or more (e.g., both) preamble(s). Additionally or alternatively, examples may include a WTRU that may use a same SS/PBCH index, but different PRACH mask for one or more transmissions of the first and/or second PRACH. Additionally or alternatively, examples may include a WTRU that may use a same PRACH mask, but different SS/PBCH index for one or more transmissions of the first and/or second PRACH.

Systems, methods, and apparatuses are provided herein with respect to subsequent RACH transmission for a second TA loop. In examples, a WTRU may determine (e.g., and/or use) an uplink TA value for transmission of an uplink signal based on the single TA support (e.g., a single TA loop being maintained by an accumulative TA control mechanism). For example, the single TA support may be applied based on a first PRACH that the WTRU had transmitted. For example, the single TA support may be applied based on a first PRACH that the WTRU had transmitted during an initial access procedure. For example, the single TA support may be applied based on a first PRACH that the WTRU had transmitted after receiving a PDCCH order based on the single TA (e.g., and/or TAG) support, and/or for communication with a first TRP (e.g., a primary TRP, one single TRP, a cell, and/or the like).

In examples, the WTRU may be indicated (e.g., from a gNB) to transmit a second PRACH (e.g., via a PDCCH order, via a "second-TA-initiating" PDCCH order, by an indication for initiating a second TA loop, and/or the like), where the second PRACH transmission may be for initiating (e.g., creating, updating, adding, newly initiating, maintaining, and/or the like) a second TA loop, in addition to the (e.g., on-going) first TA loop (e.g., the single TA loop). In examples, the WTRU may determine that a (e.g., PDCCH-order based) PRACH is for a general (e.g., existing) PRACH transmission based on the single TA support (e.g., so far), and/or for a special (e.g., PDCCH-ordered) PRACH for initiating (e.g., and/or updating) a second TA loop. For example, the WTRU target determination may be based on an explicit indicator associated with (e.g., comprised in) a DCI indicating the special (e.g., PDCCH-ordered) PRACH for initiating and/or updating the second TA loop. For example, the WTRU target determination may be based on an implicit indication that includes one or more configuration parameter(s) (e.g., preamble index, SSB index, SS/PBCH index, PRACH mask, one or more PRACH resource(s), and/or the like) associated with the special (e.g., PDCCH-ordered) PRACH.

In response to receiving the special (e.g., PDCCH-ordered) PRACH for initiating (e.g., and/or updating) a second TA loop, the WTRU may transmit the special PRACH toward a second TRP. For example, transmitting the special PRACH toward the second TRP may be based on one or more of the following. Transmitting the special PRACH toward the second TRP may be based on a beam/TCI-related parameter that may be associated with the special PRACH. Transmitting the special PRACH toward the second TRP may be based on (e.g., a source RS of) a unified TCI associated with the second TRP. Transmitting the special PRACH toward the second TRP may be based on a source quasi co-location (e.g., QCL) RS associated with the special PRACH. Transmitting the special PRACH toward the second TRP may be based on an additional and/or separate timing reference (e.g., spatial filter based on the RS indicator, point) obtained and/or measured from a DL RS (e.g., a TRS associated with the second TRP, an SSB associated with the second TRP, a DL RS associated with the second TRP, and/or the like) associated with the special PRACH.

The WTRU may receive an RAR in response to transmitting the special PRACH. In examples, the RAR may include an indication of a second TA value (e.g., to be applied for the second TA loop). In examples, the RAR may be a second RAR to be transmitted from the second TRP. In examples, the RAR may be a first RAR to be transmitted from the first TRP (e.g., the primary TRP), based on a pre-configuration being delivered to the WTRU. In examples, the beam/TCI for the first RAR being transmitted from the first TRP may be pre-configured to the WTRU.

In response to receiving the RAR, the WTRU may (e.g., be configured to) create a (e.g., new) second TA loop for accumulation (e.g., if configured) where the second TA loop may include the second TA value as an initial value for the second TA loop. In response to receiving the RAR, the WTRU may apply the second TA value for one or more subsequent uplink transmissions toward (e.g., associated with) the second TRP until a next RAR associated with the second TRP is received, e.g., if an accumulative TA mode is not configured.

In examples, a WTRU may maintain the first TA loop based on a first timing reference point (e.g., obtained and/or measured from a first DL RS that may be associated with the first TRP) and/or one or more first TA values that may be accumulated based on receiving one or more TA commands that may be associated with the first TA loop. In examples, the WTRU may maintain the second TA loop based on a second timing reference point (e.g., obtained and/or measured from a second DL RS associated with the second TRP) and/or one or more second TA value(s) that may be accumulated based on receiving one or more TA commands that may be associated with the second TA loop. Increased reliability and/or flexibility in managing the one or more (e.g., two) separated TA values and/or loops may result, each toward the first TRP and/or the second TRP. The increased reliability and/or flexibility may be based on creating the separated second TA loop in response to receiving the DCI including the special (e.g., PDCCH-ordered) PRACH.

In examples, the WTRU may (e.g., be configured to) apply the one or more second TA values (e.g., to be accumulated based on receiving one or more TA commands that may be associated with the second TA loop) based on the first timing reference point (e.g., obtained and/or measured from a first DL RS that may be associated with the first TRP). In examples, applying the one or more second TA values (e.g., to the second TA loop) based on the first timing reference point may imply that a timing reference (e.g., point) may be shared for the first TRP and/or the second TRP. In an example, TA accumulation loops may be separated between the first TRP and the second TRP. In an example, applying the one or more second TA values (e.g., to the second TA loop) based on the first timing reference point may imply that a timing reference (e.g., point) may be shared for both the first TRP and the second TRP, but TA accumulation loops are separated between the first TRP and the second TRP.

In examples, the WTRU may maintain the first TA loop based on a first timing reference point (e.g., obtained and/or measured from a first DL RS associated with the first TRP) and/or one or more first TA values being accumulated based on receiving one or more TA commands associated with the first TA loop. In examples, the WTRU may maintain the second TA loop based on the same first timing reference point (e.g., being shared between the first TRP and the second TRP) and/or one or more second TA values that may be accumulated based on receiving one or more TA commands that may be associated with the second TA loop. WTRU implementation complexity may be reduced in managing the two separated TA values and/or loops, each toward the first TRP and/or the second TRP, which may be based on a shared timing reference point obtained, which may be based on a DL RS.

In examples, a WTRU may (e.g., be configured to) apply a sequential RACH transmission, after a first RACH transmission. In examples, a WTRU may have one or more RACH transmissions after a known and/or pre-configured time interval. The time separation between one or more (e.g., each) PRACH transmissions may be fixed, semi-statically and/or dynamically indicated and/or configured. In examples, time separation may be configured and/or indicated based on a reported WTRU capability. In examples, a WTRU may determine the time separation based on another system parameter and/or mode of operation (e.g., cell index, TDD/FDD, BWP index, multiple TA loop configuration, multiple TRP related configuration, and/or the like).

In examples, in a sequential-based RACH transmission, a WTRU may use a same or different RACH resource. For example, a RACH resource for each transmission may be selected and/or indicated from a same and/or a TRP-based configured pools. In examples, once a WTRU receives a DCI from one of the TRP including a PDCCH order RACH to initiate a RACH transmission for one or more (e.g., all) TRP links, the WTRU may follow one or more of the following rules for determining the order of RACH transmission for one or more (e.g., each) TRP(s). In examples, the WTRU may (e.g., always) start the sequential RACH transmission with the TRP that has sent the PDCCH order RACH. Additionally or alternatively, the WTRU may begin the sequential RACH transmission (e.g., always) with a fixed TRP link (e.g., the link associated to the primary TRP, the link associated with the CORESETPoolIndex=0, and/or the like). In examples, the WTRU may begin the sequential RACH transmission with the TRP that may have the closest RACH occasion.

In examples, once a WTRU receives a DCI from one of the TRP including a PDCCH order RACH, the WTRU may resolve collision with an already scheduled uplink transmission for the other TRP link based on one or more of the following. In examples, the WTRU may ignore the received grant, and/or drop for the scheduled uplink transmission. Additionally or alternatively, instead of dropping the scheduled transmission, the WTRU may delay RACH to the next RACH transmission occasion. Alternatively or additionally, if the scheduled uplink transmission is intended for a PUCCH, and/or a PUSCH including HARQ feedback, the WTRU may ignore the PDCCH order RACH and/or may proceed with the scheduled transmission.

Multi TA operation may be performed within a TAG. Examples may include timing alignment expiration. In examples, configuration and/or operation of a Timing Advance Timer (TAT) may occur per TRP. A WTRU may be configured with a Timing Advance Timer (TAT) per TRP. The TAT may be independently configured per TRP link, for example, as part of a TRP-specific TAG configuration. A TAT configuration may include one or more of the following. A TAT configuration may include TRP identifier (e.g., the TRP the TAT applies to). A TAT configuration may include a TAG identifier. A TAT configuration may include a TAT duration (e.g., a time duration in ms). A TAT configuration may include one or more WTRU actions to perform upon TAT timer expiry. A TAT configuration may include one or more TRP links the one or more expiry actions are to be applied to. A TAT configuration may include one or more serving cells the one or more expiry actions are to be applied to.

Additionally or alternatively, the TAT configuration for a TRP may include a delta configuration from a reference TRP and/or TAG and/or TAT configuration (e.g., the TAT configuration for the pTRP, and/or a common TAT configuration provided in system information). Additionally or alternatively, a delta TAT configuration may include one or more of: a reference TRP and/or TAG and/or TAT configuration identifier; and/or a delta configuration from a reference TRP and/or TAT and/or TAG configuration. For example, a delta configuration from a reference TRP and/or TAT and/or TAG configuration may consist of one or more of: an offset time, and/or an offset timer duration.

A per-TRP timing alignment timer may include one or more start and/or stop conditions. A WTRU may start and/or restart the TAT timer associated with a TRP link, for example, upon reception of one or more of the following. A WTRU may start and/or restart the TAT timer associated with a TRP link upon reception of a Timing Advance Command MAC CE. A WTRU may start and/or restart the TAT timer associated with a TRP link upon reception of an Absolute Timing Advance Command (e.g., in response to a MSGA (PRACH) transmission including C-RNTI MAC CE). A WTRU may start and/or restart the TAT timer associated with a TRP link upon reception of a DCI. A WTRU may start and/or restart the TAT timer associated with a TRP link upon reception of a TAG configuration and/or reconfiguration. A WTRU may start and/or restart the TAT timer associated with a TRP link upon reception of a TAT configuration and/or reconfiguration. A WTRU may start and/or restart the TAT timer associated with a TRP link upon reception of System information (e.g., SIB1). A WTRU may start and/or restart the TAT timer associated with a TRP link upon reception of an RRC message (e.g., RRCSetup).

A WTRU may stop the TAT timer associated with a TRP link, for example, under one or more conditions. A WTRU may stop the TAT timer associated with a TRP link, for example, when the Contention Resolution is considered not successful. A WTRU may stop the TAT timer associated with a TRP link, for example, when the Contention Resolution is considered successful for System Information (SI) request, for example, after transmitting HARQ feedback for MAC Protocol Data Unit (PDU), which may include WTRU Contention Resolution Identity MAC CE.

The WTRU may start, restart, and/or stop the TAT based on which TRP link and/or Serving Cell receives and/or transmits a message (e.g., the Timing Advance Command MAC CE). For example, the WTRU may perform one or more TAT actions associated with a TRP in response to messages transmitted/received on a TRP link. For example, the WTRU may (e.g., only) perform one or more TAT actions associated with a TRP in response to one or more messages transmitted and/or received on a TRP link. For example, the WTRU may (e.g., only) perform one or more TAT actions associated with a TRP in response to one or more messages transmitted and/or received on a pTRP link. For example, the WTRU may (e.g., only) perform one or more TAT actions associated with a TRP in response to one or more messages transmitted and/or received on one or more TRP link(s) associated with the same Serving Cell. For example, the WTRU may (e.g., only) perform one or more TAT actions associated with a TRP in response to one or more messages transmitted and/or received on one or more TRP links associated with the SpCell.

A per-TRP timing alignment timer may include one or more TAT expiry condition(s). A WTRU may perform one or more action(s) if a TAT associated with a TRP expires. Additionally or alternatively, a WTRU may perform a TAT expiry action at a fixed offset prior to timer expiry, and/or a fixed time after TAT expiry. A WTRU may perform one or more expiry action(s). A WTRU may perform the expiry action of initiating RACH. A WTRU may perform the expiry action of flushing one or more (e.g., all) HARQ buffer(s). A WTRU may perform the expiry action of notifying the network. A WTRU may perform the expiry action of releasing one or more (e.g., all) configured PUCCH. A WTRU may perform the expiry action of releasing one or more (e.g., all) configured SRS. A WTRU may perform the expiry action of clearing one or more configured downlink assignments. A WTRU may perform the expiry action of clearing one or more configured uplink grants. A WTRU may perform the expiry action of clearing one or more PUSCH resources for semi-persistent CSI reporting. A WTRU may perform the expiry action of maintaining current $N_{TA}$ until the subsequent value is updated by network (e.g. via a TA command).

A WTRU may be configured and/or may perform a different set of one or more expiry actions depending on one or more of the following conditions: which TRP link the expired TAT is associated with (e.g., whether the expired TAT is associated with a pTRP and/or sTRP; which Serving Cell the expired TAT is associated with (e.g., whether the expired TAT is associated with a TRP belonging to a SpCell, PsCell, and/or SCell); and/or the number of TRPs which have an expired TAT (e.g., the WTRU may perform a different set of one or more action(s) if one or more (multiple) TRPs have TATs expired).

A WTRU may be configured and/or perform one or more expiry action(s) (e.g., only) for the TRP link associated with the expired TAT timer. Additionally or alternatively, a WTRU may be configured and/or perform one or more expiry action(s) for one or more additional link(s) (e.g., subject to configuration). For example, the WTRU may perform one or more of the expiry action(s), as described herein for the TRP link associated with the timer which has expired. For example, the WTRU may perform one or more of the expiry action(s), as described herein, for one or more (e.g., all) TRP link(s) associated with the serving cell. For example, the WTRU may perform one or more of the expiry action(s), as described herein, for one or more TRP link(s) associated to one or more (e.g., all) serving cell(s).

In examples, upon expiry of TAT for one TRP, a WTRU may suspend UL transmission to the affected TRP and/or may maintain one or more HARQ buffer(s). The WTRU may transmit (e.g., pending) data on the suspended TRP to a still-valid TRP. In examples, the WTRU transmittal of the (e.g., pending) data on the suspended TRP may be subject to data priority, one or more available resource(s), and/or configuration.

A WTRU may be configured with respect to notification of TAT expiry. Upon TAT expiry for one or more TRP link(s), a WTRU may notify the network of TAT expiry via one or more of the following method(s). A WTRU may notify the network of TAT expire via initiating a RACH transmission on the impacted TRP link. For example, a WTRU may receive a single PDCCH order RACH to initiate a RACH transmission to acquire updated TA on the impacted link. For example, additionally or alternatively, the single received PDCCH order RACH may initiate a RACH transmission on one or more (e.g., all) TRP link(s). For example, a WTRU may receive a separate PDCCH order RACH for one or more (e.g., each) TRP link(s) where the first PDCCH may be associated with the TRP link associated with the impacted timer. Additionally or alternatively, a WTRU may notify the network of TAT expire via sending an implicit and/or explicit notification to the gNB through the link which its timer of which has not expired. For example, the notification may indicate to the gNB the expiration of the timer of the other link, so that the gNB may send a PDCCH order RACH for the impacted link. For example, if one or more (e.g., each) TAG is associated to a different subset of RACH resources, a WTRU may perform an implicit indication by using one or more PRACH resource(s) of the impacted TAG for the TRP associated with the TAG which has still-valid TA information.

A WTRU may be configured with respect to exceeding max receive time difference and/or max transmit time difference. The deployment of a multi-TRP configuration that may support beyond a cyclic prefix (CP) receive time difference may pose a challenge for the WTRU architecture. If the receive time difference goes beyond a certain level, for example, one or more (e.g., two) baseband unit(s) may be included. Including one or more additional baseband unit(s) may result in a more expensive device. A receive difference time limit may be beneficial to preserve the one or more goal(s) of this feature in terms of throughput and/or robustness of data transmissions (e.g., due to the non-collocated nature of TRP and/or one or more propagation property(ies) in one or more different frequency range(s)).

The maximum receive time difference (MRTD) and/or maximum transmit time difference (MTTD) may represent one or more threshold(s) expressed in time units, symbol units, and/or one or more part(s) of a symbol that may be specific to a WTRU hardware architecture. For example, a WTRU that may have this capability may be designed with a single baseband unit. For example, communication with one or more (e.g., both) TRPs in downlink and/or uplink may be processed simultaneously while the MRTD and/or MTTD are below a certain time threshold. In examples, one or more (e.g., two) baseband units may be included for this feature.

In a multi-TRP deployment, the one or more TRP(s) may not have a similar distance from a WTRU. In examples, the one or more indicated TA value(s) in the one or more timing advance command(s) for one or more (e.g., each) TRP(s)

may result in a relative time difference that may exceed the Maximum Transmit Time Difference (MTTD) capability of the WTRU.

A WTRU may be configured with respect to Multi-TRP. Multi-TRP may include one or more additional TRP candidate(s) measurement(s) setup and/or reporting. The one or more additional TRP(s) may be added by the network to the primary TRP before and/or (e.g., only) after one or more measurement(s) are reported by the WTRU. Procedurally, the network may configure the WTRU to measure one or more additional TRP candidate(s) in the area served by the primary TRP. The WTRU may report, for example, upon registration and/or at network request, the one or more capability (ies) of the WTRU for multi-TRP deployment. The WTRU may report its supported MRTD and/or MTTD as threshold. The network may configure a WTRU for one or more additional TRP candidate measurement(s) and/or reporting, for example, considering the WTRU multi-TRP operation timing capability (ies). In examples, the WTRU may measure the one or more additional candidate(s) and/or their relative receive time difference to the primary TRP (pTRP) and/or may report the one or more candidate(s) that have, for example, their RSRP and/or RSRQ level over a reporting quality threshold and/or the relative time difference less than WTRU reported capability for MRTD. Additionally or alternatively, the WTRU may be configured to report the one or more additional TRP candidate(s) RSRP and/or RSRQ and/or their relative receive time difference to the primary TRP (pTRP), for example, without (e.g., any) limitation regarding supported MRTD capability.

Upon receiving a measurement report that may have one or more additional TRP candidate(s) within the one or more reporting condition(s), for example, the network may configure the WTRU with an additional TRP (e.g., sTRP). Upon receiving the re-configuration message that may have an sTRP addition, for example, the WTRU may measure (e.g., measure again) the relative receive time difference. Upon the most recent measurement of the sTRP relative receive time difference, for example, the WTRU may confirm the re-configuration message to the network when the receive time difference is within its reported capabilities and/or may report a re-configuration failure, for example, if the last measured relative receive time difference is beyond supported MRTD. In examples, there may be a re-configuration failure reason field that may indicate "exceeding MRTD". The re-configuration failure may be sent as Beam Failure, for example, with the reason indicated herein. If the last measured relative receive time difference of the configured candidate is with one or more WTRU capability (ies), for example, the WTRU may start the uplink time synchronization procedure with the configured sTRP.

Additionally or alternatively, the WTRU may be configured with one or more additional sTRP(s) that are respecting (e.g., may comply with) the MRTD and/or RSRP and/or RSRQ threshold(s). The WTRU may be configured with one or more TCI state(s) for one or more (e.g., each) combination of pTRP-sTRP and/or may activate one or more TCI combination(s) (e.g., selected and/or the best TCI combination) based on, for example, the one or more latest WTRU reported measurement(s). Upon a TCI combination activation, for example, the WTRU may start one or more UL synchronization procedure(s) (e.g., based on the determined spatial filter and/or with timing based on the TA indication) with the recently (e.g., newly) activated sTRP. If the UL synchronization leads to exceeding MTTD supported by the WTRU, for example, a beam failure report with the cause "exceeding MTTD" may be sent to the network. Upon receiving a failure message with "exceeding MTTD" cause, for example, the network may activate a different TCI state combination and/or (e.g., completely) re-configure the WTRU, for example, with one or more other sTRP candidate(s) and/or one or more other TCI state(s) combination(s) with the pTRP. Additionally or alternatively, the network may remove the multi-TRP related operation from WTRU configuration.

A WTRU may be configured with respect to one or more Timing Advance operation(s) for multi-TRP in relation with MRTD and/or MTTD. The WTRU, which may be mobile within the environment, may receive one or more timing advance command(s) for one or more (e.g., both) TRPs (e.g., simultaneously), for example, after adding an sTRP and/or successfully synchronizing with the sTRP. The TRPs deployment and/or WTRU mobility may lead to one or more situation(s) where the MRTD and/or MTTD may be exceeded. Exceeding MRTD and/or MTTD may lead to the radio link failure for the active sTRP. In examples, the WTRU may report the problem.

In examples, if the relative difference between TA advance values exceeds the MRTD and/or MTTD threshold, a WTRU may do one or more of the following. In an example, if the relative difference between TA advance values exceeds the MRTD or MTTD threshold, a WTRU may send an indication of the error and/or problem to the gNB. This indication may be sent via pTRP. The pTRP may remain the anchor over an RRC message, MAC CE, and/or UCI on physical layer. Additionally or alternatively, this indication may be a Radio Link Failure (RLF) indication for the sTRP.

Upon reception of the notification from the WTRU, the network may perform one or more of the actions herein and/or a (e.g., any) combination of the action(s) herein. For example, upon reception of the notification from the WTRU, the network may reconfigure the WTRU with one or more other TCI state(s) with one or more other combination(s) pTRP-sTRP candidate(s), which may be based on the one or more latest measurement report(s) received from the WTRU, and/or may be followed by a TCI activation for a different combination and/or may continue the operation in the multi-DCI mode. For example, upon reception of the notification from the WTRU, if there is no other combination with the configured TCI pool with multi-TRP combinations, the WTRU may fall back in the single DCI mode and/or may continue in mTRP operation in TDM mode. For example, upon reception of the notification from the WTRU, the WTRU may declare a beam failure on the sTRP while indicating the strongest (e.g., best) TCI combination from the configured TCI pool based on one or more of the (e.g., the last) measurement(s). The indication of a (e.g., the best target) TCI combination may be based on a (e.g., the smallest) measured MRTD. Following the beam failure indication, for example, the WTRU may continue to monitor the CORESET associated with the sTRP (e.g., in CORE-SETPOOLIndex 1) for a beam indication within the DCI from the one or more active TCI(s).

A WTRU may be configured with respect to application timing of the one or more TA command(s). In a multi-TRP transmission, a WTRU (e.g., with simultaneous uplink transmission capability) may receive a TA command for one or more of the TRP links. An overlap between UL TRP transmissions for TRPs may occur, for example, when the TA is applied for the one or more successive slot(s). The one or more TA commands may be applied (e.g., always applied) at the beginning of the slots and/or the one or more rules may be applicable to the one or more symbol(s) of a slot (e.g., to the last symbol(s) and/or the first symbol(s) of a slot), which may be applied in the closed range (e.g., few symbols) of the slot border.

Depending on the relative timeline of an ongoing transmission of a first transmission, and/or the second transmission associated with updated TA) one or more may occur, as described herein. When the updated TA may make the associated UL transmission later than an ongoing first transmission, the ongoing transmission may proceed as scheduled. Additionally or alternatively, the transmission associated to the link with the updated TA may be shortened towards the end by the number of overlapping samples, for example, when the one or more overlapping UL transmission(s) between TRPs may not be allowed. If the updated TA slot makes the associated transmission earlier than an ongoing first transmission, for example, the ongoing transmission may proceed as scheduled. Additionally or alternatively, the transmission associated to the link with updated TA may be shortened at the start, for example, by the number of overlapping samples when the one or more overlapping UL transmission(s) between TRPs may not be allowed. In an example, the shortening for alignment of the transmissions may be done by considering a priority rule. In examples, the shortening alignment of the one or more transmission(s) may be done by considering a priority rule. If a PUCCH overlaps with a PUSCH and/or the TA application may imply shortening the PUCCH (e.g., using the normal overlapping shortening rule where the ongoing transmission may be protected), for example, the WTRU may shorten the PUSCH slot (e.g., instead of PUCCH). In examples, a PUSCH with CSI and/or (e.g., any) UCI may be protected over a (e.g., normal) PUSCH, and thus, for example, the (e.g., normal) PUSCH may get shortened.

A WTRU may be configured with respect to one or more procedures for indication and/or association of one or more (e.g., multiple) TA(s) to one or more TRP(s). In examples, a (e.g., specific) flag in the MAC CE may indicate whether the indicated TA may be intended for a first and/or a second TRP link. For example, this flag may be indicated in one or more of the (e.g., two) fields that may be reserved for the TAG ID. In examples, the CORESETPoolIndex bit may be added in the MAC CE, for example, to indicate the intended TRP link. Additionally or alternatively, the CORESETPoolIndex may be associated with one or more of the TAG ID, for example, to provide the linkage. In examples, a WTRU may determine the intended TRP for TA indication, for example, based on the scheduling PDCCH. If the PDCCH that schedules PDSCH including a MAC CE TA command is coming in CORESETPoolIndex=0, for example, the indicated TA may be applied to the TRP link associated to the CORESETPoolIndex=0. In examples, the indicated TA may be applied to the TRP link, which may be associated to the CORESET (e.g., CORESETPoolIndex=1). For example, if the PDCCH that schedules PDSCH containing a MAC CE TA command is coming in CORESETPoolIndex=0, then the indicated TA may be applied to the TRP link associated to the CORESETPoolIndex=0, otherwise it may be applied to the TRP link associated to the CORESET, for example, CORESETPoolIndex=1. In examples, a MAC CE may include TA information for one or more TRP link(s). In examples, a WTRU may (e.g., simultaneously) update the TA information for one or more TRP link. In an example, a WTRU may (e.g., simultaneously) update the TA information for one or more (e.g., multiple) TRP link(s). The association to a first and/or a second TRP link may be based on the order of indicated values in MAC CE, and/or CORESETPoolIndex, and/or the like. For example, the indicated TA information may be in absolute TA values for one or more (e.g., each) TRP, and/or in form of their relative difference. A WTRU may receive a TA value for a first TRP link (e.g., TA1) and/or a relative difference (e.g., TA_delta) for a second TRP link to determine the TA for the second link (e.g., as TA2=TA1+TA_delta). For example, once a WTRU may receive one or more TA indication(s) for one or more TRP, a WTRU may apply one or more rules, as described herein, to determine the priority of application for one or more (e.g., each) TRP. A WTRU may apply the TA for one or more (e.g., each) TRP link(s), for example, according to the timing of scheduled transmission. For example, once a WTRU receives one or more TA indication(s) for more than one TRP, a WTRU may (e.g., first) apply TA for the TRP link(s) that has/have an earlier scheduled transmission. In examples, once a WTRU receives one or more TA indication(s) for more than one TRP, a WTRU may (e.g., first) apply TA for the TRP link(s) associated to the primary TRP and/or associated to CORESETPoolIndex=0.

A WTRU may be configured with respect to one or more (e.g., multiple) TAG(s) per Serving Cell. A WTRU may be provided with one or more timing advance groups (TAG) per serving cell. One or more (e.g., each) TAG configuration may be associated with one or more different (e.g., a different) TRP link(s). A WTRU may (e.g., only) apply the TAG configuration associated with a secondary and/or an additional sTRP, for example, if the WTRU supports multi-TRP and/or multi-TA operation.

A TAG configuration for a TRP may include one or more of the parameters, as described herein: a TAG ID; a TRP identifier (e.g., which TRP the TAG configuration applies to, and/or the like); whether the TAG applies to the pTRP and/or sTRP; and/or a timeAlignmentTimer (TAT) value and/or TimeAlignmentTimerCommon value. A WTRU may receive TAG configuration information related to the primary TRP (pTRP) and/or one or more additional TRP(s) (e.g., sTRP) via system information (e.g., SIB1, and/or within the UplinkConfigCommonSIB), and/or via dedicated signaling (e.g., via RRC signaling, DCI, and/or MAC CE). For example, a WTRU may be provided with one or more TimeAlignmentTimerCommon parameter(s) associated with one or more TRP(s) within system information (e.g., within SIB1 via UplinkConfigCommonSIB). The WTRU may be provided with one or more (e.g., multiple) TAG configuration(s) (e.g., via RRC) within a MAC-CellGroupConfig, for example, via TAG-Config, where TAG information may be provided for one or more (e.g., each) TRP. For example, the TAG-Config may include a tag-ID and/or timeAlignmentTimer configuration for the primary TRP (pTRP) and/or one or more additional TRP(s) (sTRP). For example, there may be one or more (e.g., multiple) TAG-Config information element(s) within a MAC-CellGroupConfig, where one or more (e.g., each) of which may correspond to a TRP of the cell.

A WTRU may override a TAG configuration for one or more TRP(s) provided via broadcast signaling (e.g., within SIB1 via UplinkConfigCommonSIB), for example, if the WTRU receives a dedicated TAG configuration (e.g., via RRC signalling and/or MAC CE).

A WTRU may be provided with TAG configuration(s) for a set of X TRP(s), for example, via broadcast signaling (e.g., within system information) and/or TAG configuration(s) for a set of Y TRP(s), for example, via dedicated signaling (e.g., RRC configuration and/or MAC CE). For example, if set X and set Y include the same TRPs, the WTRU may override one or more (e.g., or all) TAG configuration(s) (and/or one or more associated parameter(s)) provided in set X (e.g., via broadcast signaling) with those provided in set Y. For example, if set X and set Y include one or more different TRP(s), and if the set Y includes a TAG configuration for the pTRP, the WTRU may apply this TAG configuration to one or more (e.g., all) TRP(s) within set X that are not included in set Y. For example, if set X and set Y include one or more different TRP(s), the WTRU may update the TAG configuration (e.g., only) for TRP(s) provided in both set X and Y. For example, configurations for one or more (e.g., or all) TRP(s) within set X that are not provided in set Y may be, for example, maintained or deleted. The one or more action(s) that the WTRU takes may be explicitly indicated, for example, via configuration and/or within system information.

If the WTRU and/or cell may support multi-TRP multi TA operation and (e.g., only) one TAG configuration, one or more of the following may be included. The WTRU may apply TAG information to one or more (e.g., or all) TRP(s) (e.g., the pTRP and/or one or more sTRPs) associated with the serving cell. The WTRU may be (e.g., explicitly) indicated whether the TAG configuration applies to the pTRP and/or to one or more sTRP(s). For example, this indication may be provided within MAC-CellGroupConfig, TAG-Config, SIB1, and/or one or more (e.g., any, some) other broadcast (e.g., system information), RRC, and/or MAC (e.g., MAC CE) signaling. The WTRU may apply one or more previously stored TAG configuration(s), for example, upon transition of RRC state to RRC_INACTIVE and/or RRC_IDLE (e.g., via a flag). This flag, for example, may be included in the (e.g., TAG) configuration. For example, the default TAG configuration may include one or more parameters included within a TAG configuration (e.g., a TAT value). The default TAG configuration may be provided, for example, via system information (e.g., SIB1). In examples, this (e.g., system) information may be provided via dedicated configuration (e.g., via RRC), for example, upon transition of RRC state (e.g., upon reception of the RRC Setup and/or RRC Release with suspend config message).

Figure 4:
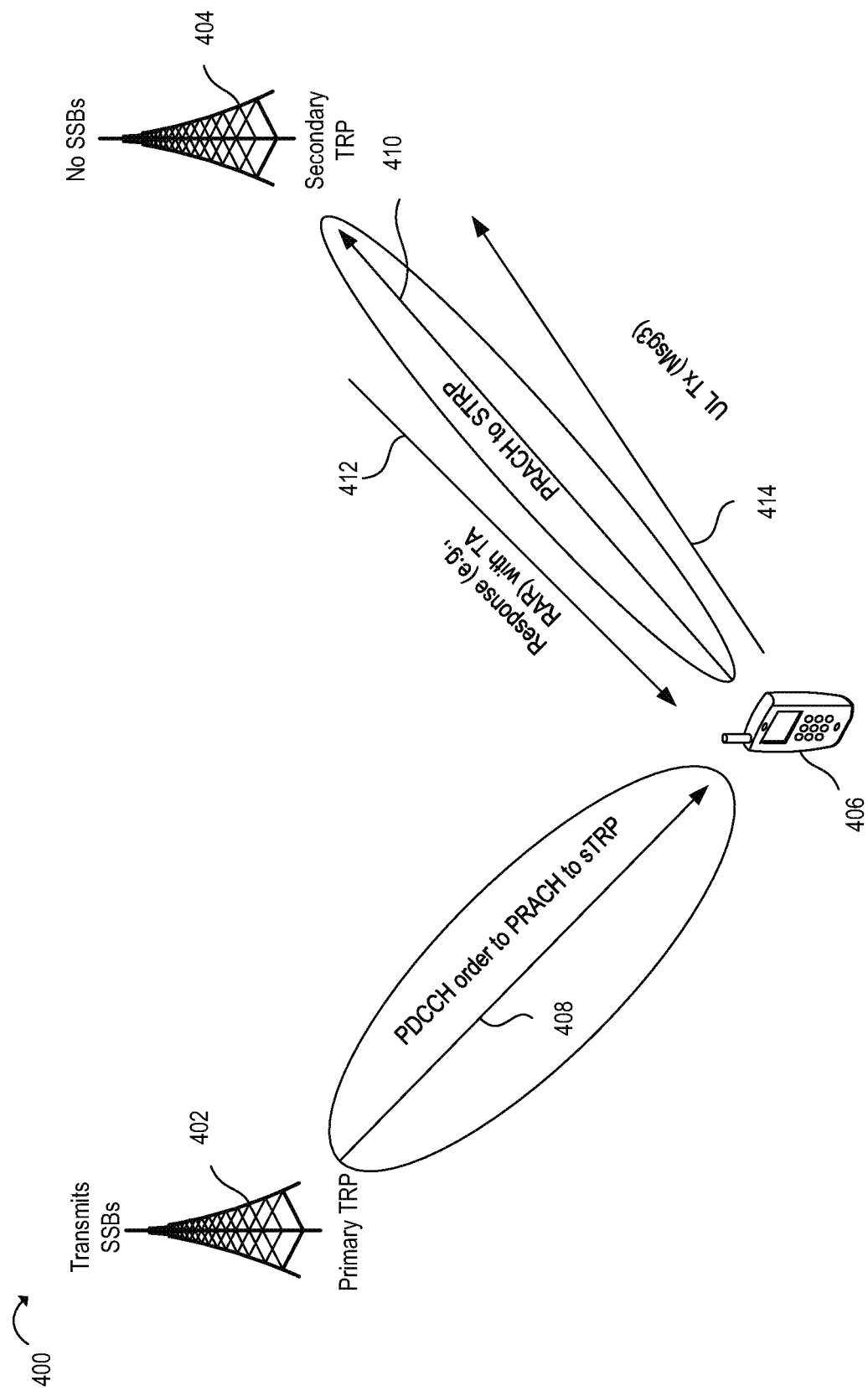
FIG. 4 is a system diagram illustrating an example timing alignment for secondary transmission/reception point (sTRP).

FIG. 4 depicts a system diagram illustrating an example timing alignment for a sTRP 400. A WTRU 406 may be configured with a Primary TRP (pTRP) 402 and/or a Secondary TRP (STRP) 404 and/or a set of one or more PRACH resource(s).

At 408, the pTRP 402 may send, to the WTRU 406, a PDCCH order to PRACH to the sTRP 404. The PDDCH order may include a preamble identifier, a TRP indication associated with the sTRP 404 (e.g., such as a CORESET-POOL index), a first SSB index (e.g., associated with the pTRP 402), a second SSB index, a first PRACH mask, a second PRACH mask, a TRP index, and/or an RS indicator (e.g., CSI-RS and/or tracking RS) associated with the sTRP 404. The WTRU 406 may use the RS indicator to determine spatial filter for transmission (Tx). If timing alignment for pTRP 402 and sTRP 404 includes (e.g., only) one PDCCH order, the PDDCH order may include the second SSB index (e.g., associated with pTRP 402), and/or the second PRACH mask.

At 410, the WTRU 406 may send a PRACH (e.g., preamble) transmission to the sTRP 404. The preamble may be based on the preamble identifier (e.g., at 408) using the determined PRACH resource and/or the (e.g., determined) spatial filter. For example, the WTRU 406 may determine a spatial filter based on the RS indicator (e.g., RS indicator indicated at 408). The WTRU 406 may determine to send, at 410, the preamble to the sTRP 404 based on the spatial filter. The WTRU 406 may use the determined spatial filter to send the PRACH to the sTRP 404. The WTRU 406 may determine a PRACH resource for transmission to the sTRP 404 based on the SSB index (e.g., associated with pTRP), the one or more PRACH resource(s), and/or the PRACH mask. If timing alignment for pTRP 402 and sTRP 404 includes (e.g., only) one PDCCH order, the WTRU 406 may transmit the same preamble to the pTRP 402 based on the second SSB index and/or the second PRACH mask.

At 412, the sTRP 404 may send a (e.g., first) response message to the WTRU 406. The (e.g., first) response may be a RAR message. The RAR message may include a TRP index, a TA (e.g., TA indication), and/or a sTRP UL grant. The WTRU 406 may receive a first response to the preamble. The first response may include a first timing advance (TA) command for the second timing alignment for transmission to the sTRP 404 and/or an index indicating the sTRP 404. If timing alignment for pTRP 402 and sTRP 404 includes (e.g., only) one PDCCH order, the RAR message may include a second TA.

At 414, the WTRU 406 may send an UL Tx (e.g., Msg3) to the sTRP 404. The WTRU 406 may use the determined spatial filter and/or timing based on the (e.g., first) TA indication/command to send the UL Tx at 414 to the sTRP 404.

What is claimed is:

1. A wireless transmit/receive unit (WTRU) comprising a processor configured to:
   receive configuration information indicating a first timing advance group (TAG) for a serving cell and a second TAG for the serving cell, wherein the first TAG is associated with a first TAG identifier (ID), the second TAG is associated with a second TAG ID, the configuration information indicates a first duration of a first timing alignment timer (TAT) associated with the first TAG for the serving cell, and the configuration information indicates a second duration of a second TAT associated with the second TAG for the serving cell;
   start the first TAT;
   start the second TAT;
   determine that the first TAT associated with the first TAG for the serving cell has expired;
   clear one or more configured downlink assignments and one or more configured uplink grants associated with the first TAG for the serving cell based on determining that the first TAT associated with the first TAG for the serving cell has expired;
   maintain a hybrid automatic repeat request (HARQ) buffer associated with the serving cell when the first TAT associated with the first TAG for the serving cell expires;
   determine that the second TAT associated with the second TAG for the serving cell has expired;
   clear one or more configured downlink assignments and one or more configured uplink grants associated with the second TAG for the serving cell based on determining that the second TAT associated with the second TAG for the serving cell has expired;
   flush the HARQ buffer associated with the serving cell based on the second TAT associated with the second TAG for the serving cell having expired; and
   start or restart at least one of the first TAT or the second TAT based on receiving a timing advance command medium access control (MAC) control element (CE).

2. The WTRU of claim 1, wherein the first TAG for the serving cell is associated with a first transmission/reception point (TRP) for the serving cell, and the second TAG for the serving cell is associated with a second TRP for the serving cell.

3. The WTRU of claim 2, wherein a first transmission configuration information (TCI) state is associated with transmissions corresponding to the first TRP associated with the first TAG for the serving cell, and a second TCI state is associated with transmissions corresponding to the second TRP associated with the second TAG for the serving cell.

4. The WTRU of claim 1, wherein the processor is configured to:
continue to perform uplink transmissions associated with the second TAG for the serving cell after expiry of the first TAT associated with the first TAG for the serving cell expires.

5. The WTRU of claim 1, wherein the processor is configured to:
suspend at least one uplink transmission associated with the first TAG to the serving cell based at least on determining that the first TAT associated with the first TAG for the serving cell has expired; and
suspend at least one uplink transmission associated with the second TAG to the serving cell based at least on determining that the second TAT associated with the second TAG for the serving cell has expired.

6. The WTRU of claim 5, wherein the processor being configured to suspend the at least one uplink transmission comprises the processor being configured to suspend a transmission apart from random access preamble transmission or MsgA transmission.

7. The WTRU of claim 1, wherein the serving cell is a first serving cell, and wherein the processor being configured to flush the HARQ buffer comprises the processor being configured to flush all HARQ buffers for the first serving cell and a second serving cell.

8. The WTRU of claim 1, wherein the processor is configured to receive the MAC CE activating a first transmission configuration indicator (TCI) state group for a control resource set (coreset), and wherein the TCI state group comprises at least one TCI state comprising a first TCI state.

9. The WTRU of claim 8, wherein the processor is configured to determine that the demodulation reference signal (DMRS) antenna port associated with one or more physical downlink control channel receptions in the coreset is quasi co-located with one or more downlink reference signals configured by the at least one TCI state, wherein the processor is configured to receive downlink control information (DCI) via the coreset, wherein the DCI indicates a second TCI state, wherein the TCI state group comprises the second TCI state, and wherein reception of a transport block (TB) based on the TCI state group comprises at least one DMRS of the TB being quasi co-located with a second reference signal indicated by the second TCI state.

10. The WTRU of claim 1, wherein the processor is configured to:
release one or more configured physical uplink control channel (PUCCH) resources and one or more configured sounding reference signal (SRS) resources based on the second TAT associated with the second TAG for the serving cell having expired.

11. A method performed by wireless transmit/receive unit (WTRU), the method comprising:
receiving configuration information indicating a first timing advance group (TAG) for a serving cell and a second TAG for the serving cell, wherein the first TAG is associated with a first TAG identifier (ID), the second TAG is associated with a second TAG ID, the configuration information indicates a first duration of a first timing alignment timer (TAT) associated with the first TAG for the serving cell, and the configuration information indicates a second duration of a second TAT associated with the second TAG for the serving cell;
starting the first TAT;
starting the second TAT;
determining that the first TAT associated with the first TAG for the serving cell has expired;
clearing one or more configured downlink assignments and one or more configured uplink grants associated with the first TAG for the serving cell based on determining that the first TAT associated with the first TAG for the serving cell has expired;
maintaining a hybrid automatic repeat request (HARQ) buffer associated with the serving cell when the first TAT associated with the first TAG for the serving cell expires;
determining that the second TAT associated with the second TAG for the serving cell has expired;
clearing one or more configured downlink assignments and one or more configured uplink grants associated with the second TAG for the serving cell based on determining that the second TAT associated with the second TAG for the serving cell has expired;
further comprising flushing the HARQ buffer associated with the serving cell based on the second TAT associated with the second TAG for the serving cell having expired; and
starting or restarting at least one of the first TAT or the second TAT based on receiving a timing advance command medium access control (MAC) control element (CE).

12. The method of claim 11, wherein the first TAG for the serving cell is associated with a first transmission/reception point (TRP) for the serving cell, and the second TAG for the serving cell is associated with a second TRP for the serving cell.

13. The method of claim 12, wherein a first transmission configuration information (TCI) state is associated with transmissions corresponding to the first TRP associated with the first TAG for the serving cell, and a second TCI state is associated with transmissions corresponding to the second TRP associated with the second TAG for the serving cell.

14. The method of claim 11, wherein the method further comprising continuing to perform uplink transmissions associated with the second TAG for the serving cell after expiry of the first TAT associated with the first TAG for the serving cell expires.

15. The method of claim 11, wherein the method further comprising:
suspending at least one uplink transmission associated with the first TAG to the serving cell based at least on determining that the first TAT associated with the first TAG for the serving cell has expired; and
suspending at least one uplink transmission associated with the second TAG to the serving cell based at least on determining that the second TAT associated with the second TAG for the serving cell has expired.

16. The method of claim 15, wherein suspending the at least one uplink transmission comprises suspending a transmission apart from random access preamble transmission or MsgA transmission.

17. The method of claim 11, wherein the serving cell is a first serving cell, and wherein the flushing the HARQ buffer comprises flushing all HARQ buffers for the first serving cell and a second serving cell.

18. The method of claim 11, wherein the method further comprising: receiving the MAC CE activating a first transmission configuration indicator (TCI) state group for a control resource set (coreset), and wherein the TCI state group comprises at least one TCI state comprising a first TCI state;
- determining that the demodulation reference signal (DMRS) antenna port associated with one or more physical downlink control channel receptions in the coreset is quasi co-located with one or more downlink reference signals configured by the at least one TCI state; and
- receiving downlink control information (DCI) via the coreset, wherein the DCI indicates a second TCI state, wherein the TCI state group comprises the second TCI state, and wherein reception of a transport block (TB) based on the TCI state group comprises at least one DMRS of the TB being quasi co-located with a second reference signal indicated by the second TCI state.

19. The method of claim 11, wherein the method further comprising releasing one or more configured physical uplink control channel (PUCCH) resources and one or more configured sounding reference signal (SRS) resources based on the second TAT associated with the second TAG for the serving cell having expired.

20. A wireless transmit/receive unit (WTRU) comprising:
a processor configured to:
receive configuration information indicating a first timing advance group (TAG) for a serving cell and a second TAG for the serving cell, wherein the first TAG is associated with a first TAG identifier (ID), the second TAG is associated with a second TAG ID, the configuration information indicates a first duration of a first timing alignment timer (TAT) associated with the first TAG for the serving cell, and the configuration information indicates a second duration of a second TAT associated with the second TAG for the serving cell;
start the first TAT;
start the second TAT;
determine that the first TAT associated with the first TAG for the serving cell has expired;
clear one or more configured downlink assignments and one or more configured uplink grants associated with the first TAG for the serving cell based at least on determining that the first TAT associated with the first TAG for the serving cell has expired;
determine not to flush a hybrid automatic repeat request (HARQ) buffer associated with the serving cell when the first TAT associated with the first TAG for the serving cell expires;
determine that the second TAT associated with the second TAG for the serving cell has expired;
clear one or more configured downlink assignments and one or more configured uplink grants associated with the second TAG for the serving cell based on determining that the second TAT associated with the second TAG for the serving cell has expired;
flush the HARQ buffer associated with the serving cell based on the second TAT associated with the second TAG for the serving cell having expired; and
start or restart at least one of the first TAT or the second TAT based on receiving a timing advance command medium access control (MAC) control element (CE).

* * * * *

UNITED STATES PATENT AND TRADEMARK OFFICE
CERTIFICATE OF CORRECTION

PATENT NO. : 12,156,158 B2
APPLICATION NO. : 18/740826
DATED : November 26, 2024
INVENTOR(S) : Virgil Comsa et al.

Page 1 of 1

It is certified that error appears in the above-identified patent and that said Letters Patent is hereby corrected as shown below:

In the Claims

In Claim 11: Column 34, Line 28, delete "further comprising".

Signed and Sealed this
Twenty-fifth Day of February, 2025

Coke Morgan Stewart
*Acting Director of the United States Patent and Trademark Office*